(12) United States Patent
Carter et al.

(10) Patent No.: US 6,538,989 B1
(45) Date of Patent: Mar. 25, 2003

(54) PACKET NETWORK

(75) Inventors: Simon F Carter, Woodbridge (GB);
Terence G Hodgkinson, Woodbridge (GB); Alan W O'Neill, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/180,102

(22) PCT Filed: Sep. 9, 1998

(86) PCT No.: PCT/GB98/02727

§ 371 (c)(1),
(2), (4) Date: Nov. 2, 1998

(87) PCT Pub. No.: WO99/13624

PCT Pub. Date: Mar. 18, 1999

(30) Foreign Application Priority Data

| Dec. 8, 1997 | (GB) | 9725985 |
|---|---|---|
| Sep. 9, 1997 | (EP) | 97306976 |

(51) Int. Cl.$^7$ ............................................ H04L 12/56
(52) U.S. Cl. ........................................ 370/229; 370/411
(58) Field of Search ................................. 370/389, 229, 370/395.2, 399, 395.21, 395, 31, 395.4, 394.41, 395.42, 395.61, 395.65, 230, 230.1, 232, 233, 234, 235, 235.1, 237, 351, 352, 413–419, 411, 465, 469, 470, 471, 472, 474, 476, 468, 477

(56) References Cited

U.S. PATENT DOCUMENTS

| 5,875,175 A | * | 2/1999 | Sherer et al. | 370/230 |
| 5,917,822 A | * | 6/1999 | Lyles et al. | 370/431 |
| 6,108,307 A | * | 8/2000 | McConnell et al. | 370/235 |
| 6,229,788 B1 | * | 5/2001 | Graves et al. | 370/230 |
| 6,304,544 B1 | * | 10/2001 | Shimivassan et al. | 370/230 |

FOREIGN PATENT DOCUMENTS

WO    WO 94/14263    6/1994

OTHER PUBLICATIONS

Cheng, "Quality of Services Based on Both Call Admission and Cell Scheduling", Computer Networks And ISDN Systems 29 (1997), pp. 555–567.

Crowcroft et al, "A Rough Comparison of the IETF and ATM Service Models", IEEE Netowrk Nov./Dec. 1995, pp. 11–16.

Bolla et al, "Adaptive Access Control of Multiple Traffic Classes in ATM Networks", Globecom '91, vol. 1 Dec. 1991, pp. 0331–0338.

Floyd et al, "Link–Sharing and Resource Management Models for Packet Networks", IEEE/ACM Transactions On Networking, vol. 3, No. 4, Aug. 1995, pp. 365–386.

O'Neill, "Internetwork Futures", BT Technology Journal, vol. 15, No. 2, Apr. 1997, pp. 226–239.

White, "RSVP and Integrated Services in the Internet: a Tutorial", IEEE Communications Magazine, May 1997.

* cited by examiner

Primary Examiner—Dang Ton
(74) Attorney, Agent, or Firm—Nixon & Vanderhye P.C.

(57) ABSTRACT

A new approach to providing both bounded-delay and best-effort operation in a packet network node is described. The bounded-delay mode is capable of providing a firm end-to-end delay bound, but in contrast to the combination of RSVP and Guaranteed service proposed within the IETF, it does this with minimal complexity.

Network nodes are provided with dual packet buffers associated with bounded delay and best effort classes of service respectively. Appropriate dimensioning, if necessary enforced through CAC methods, ensure that packets admitted to the bounded delay buffer are provided the firm delay bound. CAC methods are described which are applicable for packet flows as small as a single packet.

A means is also offered for removing the traditional network signalling phase.

A related architecture for use with hosts is also described.

21 Claims, 8 Drawing Sheets

PACKET NETWORK

The present invention relates to a packet network and to elements and hosts therein.

Prior to sending any information across a traditional connection-oriented network, a user is allocated a circuit, either by provision or by on-demand signalling. During the allocation phase it can be arranged for the circuit to meet user specified performance criteria and this is typically controlled by the connection admission rules. Consequently, once an appropriate circuit has been established information can be sent between host machines to a specified Quality of Service (QoS).

In contrast a traditional connectionless network has no requirement for circuit allocation and such networks do not incorporate connection admission control. This has the result that, during periods of network congestion, the meeting of performance criteria, and thus the satisfaction of Quality of Service requirements (such as end to end delay and delay variation) cannot be guaranteed.

It is now becoming increasingly clear that future networks will need to support services akin to those provided by traditional connection-oriented networks and also services akin to those provided by traditional connectionless networks. Furthermore, it will be essential for those services to be supported with minimal complexity and within acceptable performance trade-offs.

For the past decade, the vision for future broadband multimedia networks has been that they would be based on Asynchronous Transfer Mode (ATM) technology and the associated networking standards. However, during the early stages of standardisation, it was decided that ATM networks would be connection-oriented and not support a native connectionless mode of operation. Also ATM standards have tended to concentrate on service class optimisations, rather than taking a broader network view. For instance optimising bearer utilisation does not necessarily require the bandwidth utilisation to be optimised for each individual service class supported. More broadly it seems likely that applications are likely to evolve at a more rapid pace than is feasible for networks to track.

Potentially undesirable aspects and complexities of traditional ATM service for future networks include:

Statistical multiplexing within a service class requires complex connection admission control (CAC) based on leaky bucket source traffic descriptors.

Buffer size needed to achieve zero cell loss is indeterminate when using statistical multiplexing.

The fixed ATM cell size is unlikely to suit all services.

In a switched network a signalling phase is required irrespective of the traffic type and potentially this could create a performance bottleneck for some types of connectionless traffic.

Cell header size is a further bandwidth overhead in addition to that already imposed by any higher layer protocols (for AAL5 adaptation the cell header wastes ten percent of available bandwidth, for other AAL's it is higher).

Traditional IP networks have evolved from the concept of connectionless transport methods which to date have offered users only a "best effort" service. However, a new service model, a so called integrated services (IS) Internet, is now being proposed and addressed by the IETF (Internet Engineering Task Force) Integrated Services Working Group.

The IS Internet will support a number of service classes with particular QoS provisions.

The principal service classes being proposed are:

Guaranteed Service (GS), which supports a guaranteed bandwidth and well defined delay bound;

Controlled Load (CL) which supports a more loose guarantee of bandwidth; and the traditional Best Effort (BE).

The term flow is used to denote a stream of one or more packets produced by a given application and transmitted with a particular QoS requirement.

To support the provision of different service classes, in contrast to the present day TCP/IP protocol suite, the IS Internet will require flow state information in all the network routers.

So far formal analysis has concentrated on the Guaranteed Service class for which it is proposed that the guaranteed delay bound will be met by using token bucket traffic descriptors in the CAC algorithm and scheduling schemes like Weighted Fair Queuing (WFQ). Although absolute delay bounds are guaranteed by this approach, it appears that they could be excessively pessimistic and under certain circumstances result in unnecessarily complex processing (i.e. under some circumstances the potential benefits may be outweighed by the additional complexity).

Should this prove to be the case, alternative and more simple solutions giving more realistic delay bounds will be desirable.

Potentially undesirable aspects and complexities of Guaranteed Service for future networks include:

The delay control offered by WFQ may become negligible when GS is operating under conditions of time contention rather than bandwidth contention (i.e. no statistical multiplexing).

Although WFQ gives both bandwidth sharing and strict flow isolation, the need for this may diminish as the buffer backlog bound decreases and/or an appropriate upper limit is imposed on the maximum datagram size.

Statistical multiplexing within the GS class requires complex CAC based on token bucket traffic descriptors.

Resource Reservation Set-Up Protocol (RSVP) signalling is required to establish whether or not the requested end to end delay bound can be supported.

At present WFQ is applied on a per flow basis so it is computationally intensive and this may lead to a potential performance bottleneck as network speeds increase and/or datagram sizes decrease (less time to compute datagram scheduling).

Furthermore, traditionally telecommunications networks have been designed on a basis that network usage patterns and traffic statistics are well understood and relatively stable parameters but it is now becoming obvious from the growth of the Internet and the way in which it is being used that these parameters are becoming increasingly uncertain. It is also anticipated that this trend is set to continue well into the future.

Consequently, future network designs must be robust enough to cope with these uncertainties but they should not be at the expense of utilising unnecessarily complex network control techniques. Present indications suggest however that this may well happen in the area of QoS performance guarantees.

According to the invention, there is provided a packet network element comprising at least one input for receiving flow based packets; at least one output of predetermined bandwidth; wherein a received packet is associable with a first or second class of service; means for directing each received packet on the basis of its class to a first or a second corresponding packet buffer, said first packet buffer being allocated a predetermined portion of the output bandwidth; said second packet buffer being allocated the remaining portion of the output bandwidth; bandwidth requirement determination means for determining a bandwidth requirement associated with at least said first class flows; means for allowing admission of the first class flow packets to the first packet buffer if said bandwidth requirement can be met; and means for directing packets from the first and second packet buffers to an output.

In this way a comparatively simple network element architecture advantageously offers a service similar to that associated with a traditional connection-oriented network to a first class of packets but offers a service similar to that associated with traditional connectionless networks to a second class of packets.

Preferably, said means for allowing admission is operable to apply a peak rate test, allowing admission to the first buffer if the currently unused portion of said predetermined portion of the output bandwidth is able to meet said peak rate bandwidth requirement.

In some circumstances, this allows the formulation of a fixed delay bound whilst avoiding the potential processing bottlenecks that may limit the throughput of more complex schemes—first class flow packets admitted to the first packet buffer will be provided the guaranteed delay bound. Furthermore this is achieved without per flow scheduling and hence provides for scalability which is of immediate and recognised concern in building large networks.

In more generally applicable embodiments, said means for allowing admission is operable to apply said peak rate test and to apply a buffer-fill test, allowing admission if said first packet buffer has sufficient space to accept another flow.

Such embodiments have the advantage that they can provide a guaranteed delay bound even when only a small number of first class flows are handled by the element. The buffer-fill test is likely to be unnecessary in high-speed core network elements that handle a large number of first class flows.

In preferred embodiments, said admission allowing means is arranged to allow admission of the first class flow packets to the first packet buffer only if the number of flows the first packet buffer is sized to accommodate minus the number of flows currently accommodated is at least unity and if the free portion of the output bandwidth allocated to the first packet buffer minus the proposed peak rate flow bandwidth requirement is greater than or equal to zero.

In this way more particular admission control rules may be effected as to provide the guaranteed delay bound for first class flow packets admitted to the first packet buffer.

Further preferably means are provided to admit first class flow packets to the second packet buffer if they were refused admission to the first packet buffer.

In this way a 'soft failure' is provided for the admission control such that packets which have not been admitted to the first packet buffer may be admitted to the second packet buffer for forwarding for the duration of the flow or until such time as they may be admitted to the first buffer.

Some embodiments have a class determining means for determining whether a received packet is associated with a first or second class of service. This is required in elements where the association of a packet with a given class is not determinable from, say, the interface on which the packet arrives.

Yet further preferably said class determining means is arranged to read a class identifying portion from a said received packet.

In this way 'signalling on the fly' may be effected which advantageously removes the need for a separate network signalling phase.

Yet further preferably said bandwidth requirement determining means is arranged to read a peak rate flow bandwidth requirement information portion from a said received packet.

Again, in this way 'signalling on the fly' may be effected which advantageously removes the need for a separate network signalling phase.

Yet further preferably said bandwidth requirement determining means is arranged to determine particular peak rate flow bandwidth requirement values for respective single packet flows.

In this way single packet flows may be flagged for particular treatment.

According to a second aspect of the invention there is provided a host element for use in association with a packet network comprising: means for generating packet based flows and for associating each flow with a respective selected associated first or second class of service; a first packet buffer arranged to receive packets associated with the first class of service; means for controlling the first packet buffer size; a second packet buffer arranged to receive packets associated with the second class of service; and means for directing packets from the first and second packet buffers to an output arranged to ensure that the first class packet flow rate does not exceed a selected peak rate bandwidth.

In this way a host architecture advantageously provides for the creation of flows with a strictly bounded peak rate bandwidth removing the necessity for more complex traffic descriptors.

Preferably means are provided for writing the selected associated first or second class of service into a class identifying portion of said packets.

In this way packets may be created such as to provide for 'signalling on the fly', advantageously removing the need for a separate network signalling phase.

Further preferably means are provided for writing a peak rate flow bandwidth requirement information into a peak rate flow rate bandwidth requirement portion of said packets.

Again in this way packets may be created such as to provide for 'signalling on the fly', advantageously removing the need for a separate network signalling phase.

Specific embodiments of the present invention will now be described by way of example and with reference to the accompanying drawings in which.

Figure 6A:
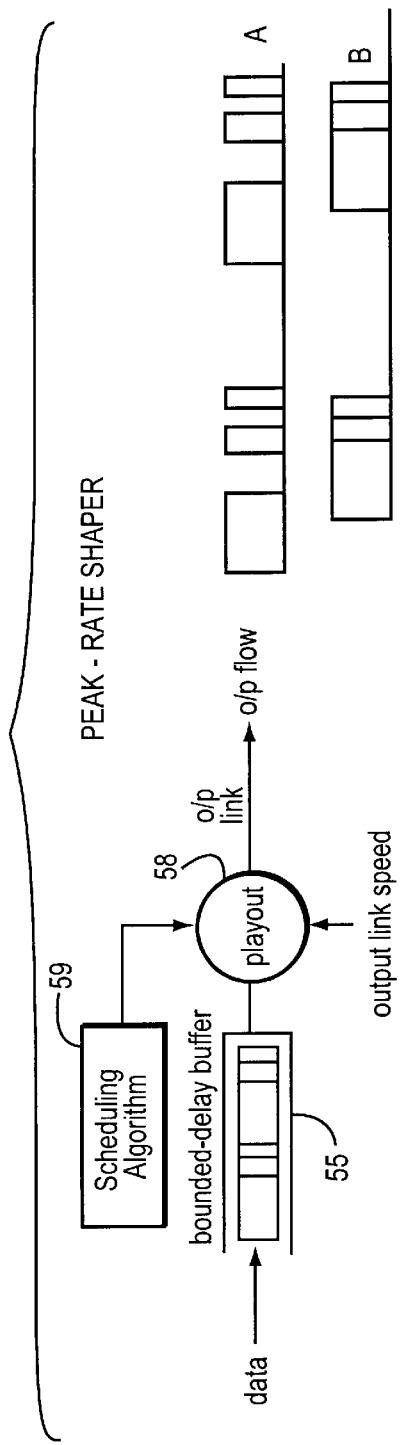
Figure 6B:
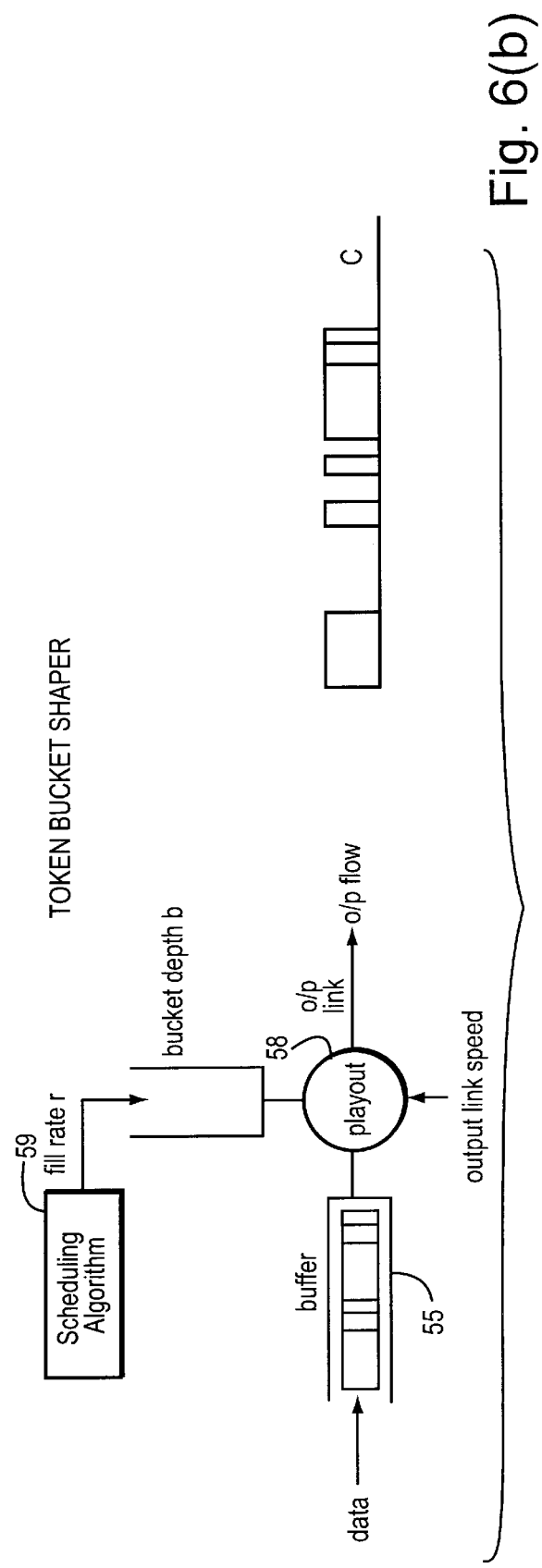
Figure 7:
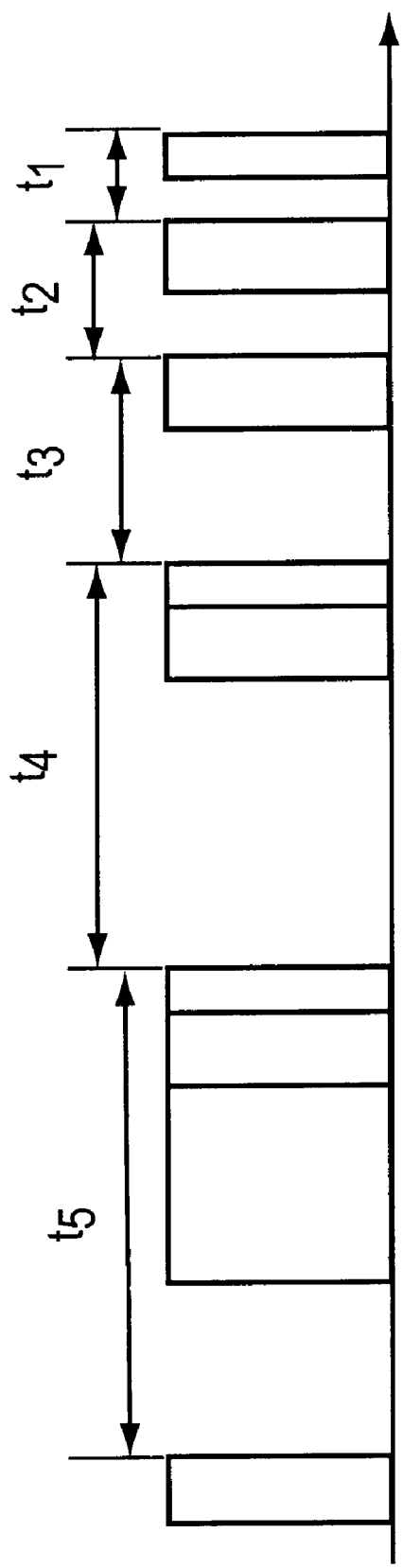

FIGS. 6(*a*) and 6(*b*) illustrate a comparison of two traffic shaping schemes; and FIG. 7 represents an exemplary flow profile.

A sending host and a receiving host are connected by means of a network comprising elements or nodes and interconnecting links. An application running on the sending host produces data packets or datagrams, the term 'flow' being applied to denote a stream of one or more packets produced by the application and transmitted with a particular Quality of Service (QoS) requirement.

The service requirement of each respective flow is chosen for the purposes of transmission across the network as one from at least two defined service classes with associated Quality of Service (QoS) levels, typically one of either a so called bounded delay class or a so called best effort class.

If the flow is to be transmitted across the network in bounded delay mode then the network must be able to deliver the constituent packets end to end in a time bounded by the maximum stated delay. If the flow is to be transmitted across the network in best effort mode then the network will deliver the constituent packets without a maximum delay bound being specified.

A choice of which of these modes to employ will lie with the application running on the sending host.

A number of network elements or nodes of alternative architecture are illustrated in FIGS. 1(a) to 1(d). These elements or nodes may, for example, be implemented using well known router technology, a typical example being those available from Cisco Inc.

Figure 1A:
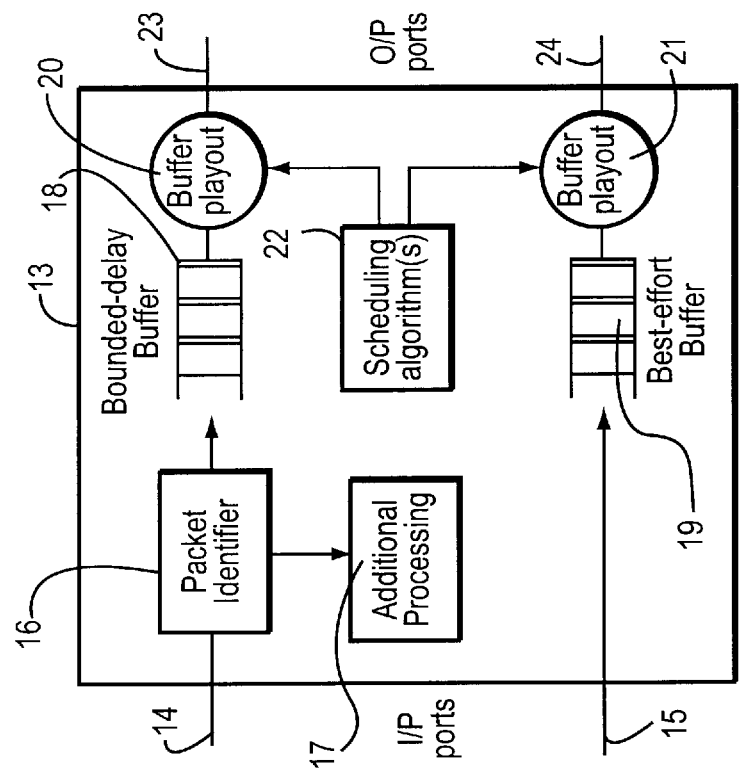
FIG. 1 illustrates different architectural configurations of network elements.

The network element (1) illustrated in FIG. 1(a) has one or more packet input ports (2) connected to input links (not shown) to receive packet based flows.

As each network element (1) will support either bounded delay or best effort network modes of operation, a mode identifier (3) is provided to determine for each packet received from an input (2) with which one of the two modes the packet is associated and then to direct the packet to an appropriate packet buffer. A single mode identifier (3) may be provided in respect of all the input ports or alternatively more than one may be provided.

One or more first packet buffers (4) of predetermined size, associated with the bounded delay mode of operation and dimensioned so as to accommodate a certain number of flows, have one or more associated packet identifiers (5) through a particular one of which the packet passes before admission to one of the buffers (4).

This packet identification may then initiate further processing in a processing element (6). As a result of this further processing an admission decision, typically a connection admission control (CAC) decision may be made as to whether or not to admit the packets of the new flow to one of the first buffers (4).

One or more second packet buffers (7) of predetermined size, associated with the best effort mode of operation, store those 'best effort' packets directed to it or them from the mode identifier (3). 'Bounded delay' packets may also be directed to the second packet buffer if they have been refused admission to the first packet buffer as will be discussed below.

Each of the first and second buffers (4, 7) have buffer playout elements (8, 9) which are controlled respectively by one or more scheduling elements (10). Each scheduling element (10) is controlled by means of an appropriate scheduling algorithm.

Each buffer playout element is connected to an output port (11,12) which thence connects to an output link (not shown).

With physically distinct output ports, the scheduling will in fact reduce to completely independent scheduling of the respective buffer playouts (8, 9).

The output ports (11, 12) associated with the one or more bounded delay buffers (4) and the one or more best effort buffers (7) respectively are allocated predetermined shares of the total output bandwidth.

As discussed it will be clear that although schematically only a single input (2) is indicated in FIG. 1(a), each such network element (1) may have multiple inputs (2) as to receive flows from several hosts or other network elements.

Similarly, the network element (1) may have multiple outputs (11, 12) whereby a single bounded delay buffer (4) will exist for each bounded delay mode output port (11) and similarly for the best effort buffer (7).

If the associated output links (not shown) are physically distinct then scheduling will be completely independent. If, however, the output links for the bounded delay and best effort traffic are merely virtually separate then, depending on the technology, a range of multiplexing options may present itself.

Yet further it is to be noted that the bounded delay and best effort buffers (4, 7) may also be virtually rather than physically separated.

Figure 1B:
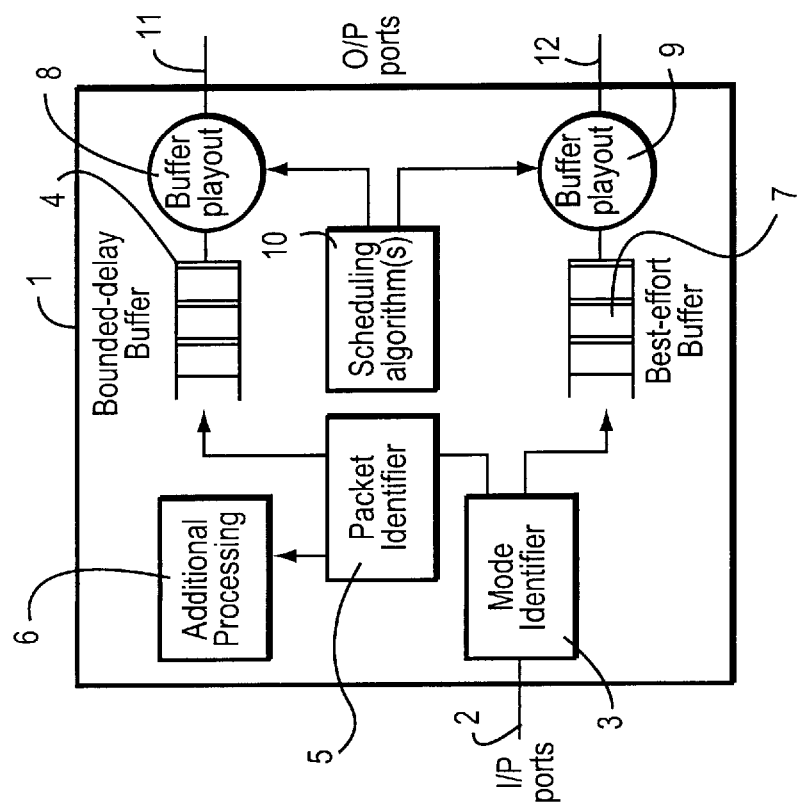

The network element (13) illustrated in FIG. 1(b) is similar to that shown in FIG. 1(a) but is provided with one or more first and second input ports (14, 15). Consequently the explicit mode identifier (3) of the FIG. 1(a) depiction need not be utilised as the sets of inputs (14, 15) themselves may now be thought of as associated with the bounded delay and best effort modes respectively. However an explicit mode identifier (3) of the FIG. 1(a) form may still be useful to act in a policing function to ensure that all incoming packets are of the correct mode.

Each of the first input ports (14), associated with the bounded delay mode, is therefore directly connected with a packet identifier (16) with associated additional processing element (17) as discussed above with regard to FIG. 1(a) before connection to a bounded delay buffer (18). Each of the second input ports (15) associated with the best effort mode, is connected directly with a best effort buffer (19).

As with the FIG. 1(a) depiction there will exist a bounded delay and a best effort buffer (18, 19) with associated buffer playout elements (20, 21) and scheduling element (22), for each respective bounded delay and best effort output port (23, 24).

Figure 1D:
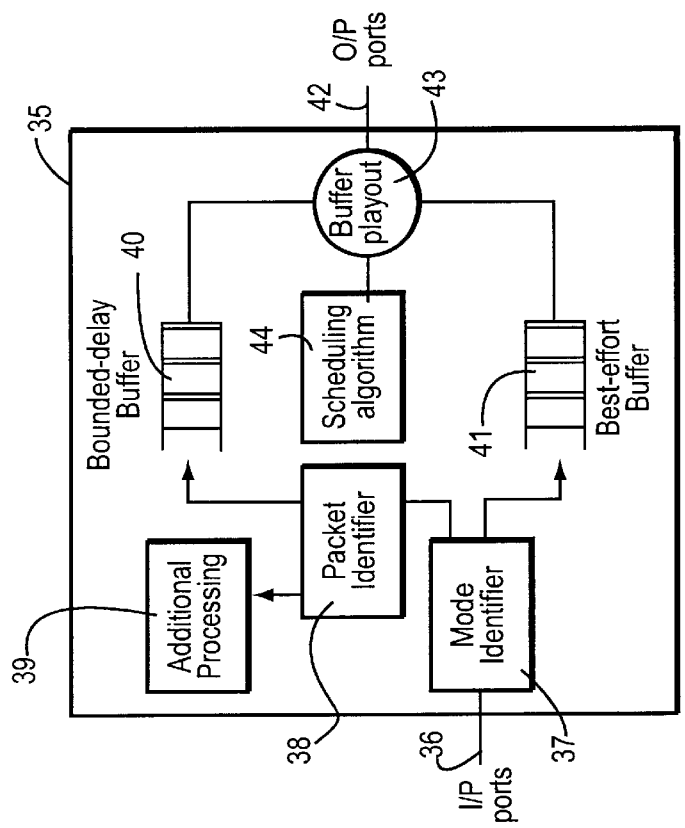
Figure 1C:
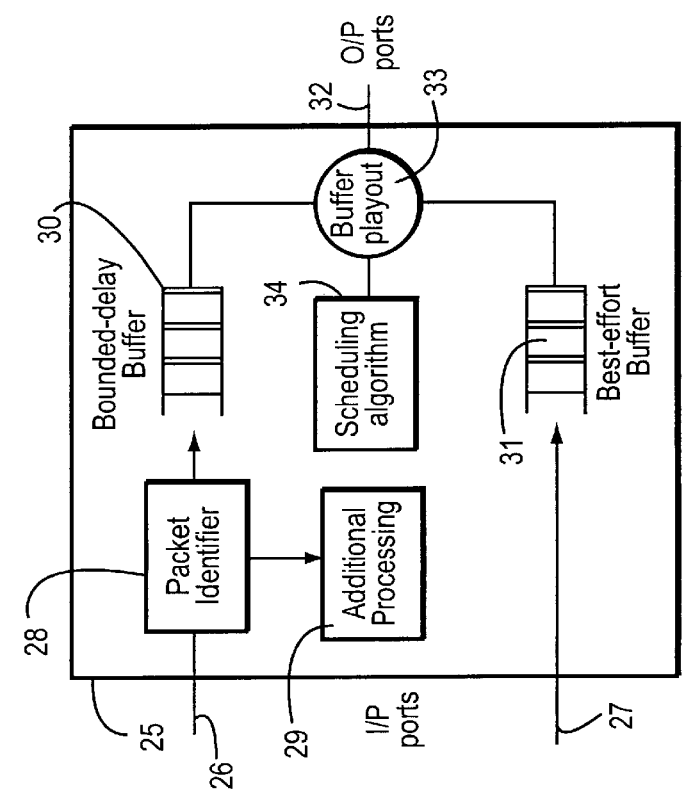

The network element (25) illustrated in FIG. 1(c) is similar to that shown in FIG. 1(b) in terms of input, packet identifier, additional processing, bounded delay and best effort buffer elements (26, 27, 28, 29, 30, 31) but is only provided with a single set of output ports (32) associated with both the bounded delay and best effort modes. For each such output port (32), a dual buffer structure (30, 31) will be provided. Consequently for each output port (32) the respective bounded delay and best effort buffers are played out by a single buffer playout element (33), under the control of a scheduling element (34), which is then connected to this single output port (32).

Since the two buffers (30, 31) share the same output port (32), completely independent scheduling of the playout will not be possible, so more complex scheduling algorithms may be required to control the buffer playout element (33) and performance interactions between the two modes might occur. A range of suitable scheduling approaches are known.

Simple priority scheduling always selects the next packet from the first buffer (30), if the first buffer (30) contains at least one packet. In this way the best possible service is given to the first buffer (30) in respect of complete packets. Where the bounded delay traffic is a small proportion of the total, the effect of this on the best effort traffic may be relatively minor.

Where the value given by the maximum best-effort packet length divided by the link-speed is small compared with the specified value of delay bound for a node, or is otherwise acceptably low, behaviour of best-effort traffic may be said to exert little influence on the bounded-delay class traffic. Where this is not the case, 'suspend-resume' scheduling may be considered as an alternative to simple priority scheduling.

'Suspend-resume' scheduling of best effort packets will allow transmission of a best effort packet to be suspended as soon as a bounded delay packet is available for transmission. Thus best effort packets are effectively fragmented on the data link layer to accommodate bounded delay packets.

Finally, the network element (35) illustrated in FIG. 1(d) is provided with the one or more first inputs (36) and hence mode identifiers (37) and associated packet identifier, additional processing, bounded delay and best effort buffer structure (38, 39, 40, 41) of FIG. 1(a) and the single set of outputs (42) and hence single buffer playout elements (43) and scheduling element (44) of FIG. 1(c).

It will be clear that the ability of the network element (1, 13, 25, 35) to offer the bounded delay mode of operation will depend on ensuring that the sum of the peak-rates of all contending flows does not exceed the fraction of the output bandwidth allocated to bounded-delay traffic. Specifying peak-rate bandwidth for a flow shall be taken to mean that the host generating the flow is required to shape the traffic in terms of packet separation time as if the host's output link speed were constrained to the specified peak-bandwidth. The means to control the peak-rate sum may be either appropriate dimensioning, or the application of CAC rules. However, control of the peak-rate sum is a necessary but not always sufficient condition to provide bounded-delay operation. Depending on the particular configuration of the element, it may also be necessary to control the number and packet-size of bounded-delay flows.

Equations 1A and 1B below represent a multi-packet delay bound for an element, where: link_rate is the operating speed of the output link being considered, mux_ratio is the ratio of output port link-speed to input-port link-speed, $N_{ip}$ is the number of input ports carrying Bounded-delay (8D) class flows and which are driving the output links, $N_{flows}$ is the maximum number of bounded-delay flows, $l_{max}$ is maximum size of bounded-delay class packets, and $l_{be}$ the maximum size of best-effort packets:

Equation 1A:

$$\frac{l_{max}}{link\_rate}\left\{1+(N_{flows}-1)\left\{1-\frac{mux\_ratio(N_{flows}-N_{ip})}{N_{ip}(N_{flows}-1)}\right\}+\frac{l_{be}}{l_{max}}\right\}$$

for mux_ratio < $N_{ip}$ and $$\frac{l_{max}}{link\_rate}\left\{N_{ip}+\frac{l_{be}}{l_{max}}\right\} \text{ for mux\_ratio} \geq N_{ip} \quad \text{(Eq. 1B)}$$

It will be clear that an understanding of Equation 1A and Equation 1B or similar expressions together with peak-rate bandwidth control, can be used as the basis for CAC rules whereby new flows can be tested as to whether they can be admitted without violating a specified delay bound. These particular equations represent the worst-case distribution of flows across input ports.

Equations 1A and 1B are sufficiently general to apply to a range of situations. However, at certain particular cases of interest they reduce to a simplified form, and for the purposes of illustration, two examples are given. In each example the term $l_{be}$/link_rate has been assumed small enough to be neglected.

If mux_ratio=$N_{ip}$, Equation 1A reduces to:

$$\frac{l_{max} \cdot N_{ip}}{link\_rate} \quad \text{(Eq. 2)}$$

In this case the delay across this element is bounded automatically, in that a delay bound can be set even with no knowledge of the actual number of flows. This might represent the case of an access node, where the bandwidth available on outgoing links has been dimensioned to accommodate the sum of the bandwidths of all the incoming links bearing bounded-delay traffic.

If mux_ratio=1, and $N_{flows}>>N_{ip}>>1$, Eq (1B) approximates to:

$$\frac{l_{max} \cdot N_{flows}}{link\_rate} \quad \text{(Eq. 3)}$$

This might represent the case of a core network node with equal input and output link bandwidths and more than four (for example) sets of input and output ports. In this case, bounded-delay operation is no longer automatic in that some degree of control is needed over flows admitted to the bounded delay class to ensure that a delay-bound can be guaranteed.

A peak bandwidth CAC test may be expressed by Equation 4:

$$\frac{P_{k\_flow}+P_{k\_accum}}{P_{k\_alloc}} \leq 1 \quad \text{(Eq. 4)}$$

Where $P_{k\_flow}$ is the peak-bandwidth of the new flow requiring admission to the Bounded Delay (BDI class, $P_{k\_accum}$ is the sum of the peak bandwidths of all currently-accepted BD flows, and $P_{k\_alloc}$ is the total bandwidth allocated for BD traffic. This describes the test made against new flows in checking that the sum of the peak-bandwidths of the new flow and currently-admitted flows does not exceed the allocated bandwidth. The term $P_{k\_alloc}$ may be chosen to be less than the link-rate in order to guarantee a certain level of bandwidth for the best-effort class.

In the case described by Equation 12), and given known restrictions on $N_{ip}$ and $l_{max}$ the test described by Equation (4) may be the only necessary condition for CAC.

In the case described by Equation (3), in addition to applying the peak bandwidth test, it is also necessary for the CAC process to restrict $N_{flows}$ to some value, $N_{flows\_alloc}$ in order to establish a delay bound. However, by defining a minimum peak-bandwidth, $P_{k\_min}$, which is taken to be the minimum peak bandwidth with which any flow can be associated, the restriction to $N_{flows\_alloc}$ occurs implicitly in applying the peak-bandwidth CAC condition. Thus, $N_{flows\_alloc}$ is restricted to: $P_{k\_alloc}/P_{k\_min}$ and the delay bound, $T_{bound}$ is then:

$$T_{bound}=\frac{l_{max} \cdot N_{flows\_alloc}}{link\_rate} \quad \text{(Eq. 5)}$$

It will be evident that in this example a required delay bound could be chosen by a network operator by specifying $l_{max}$ and $P_{k\_min}$.

It may be desirable under some condition to obtain better utilisation of the BD class by using knowledge of each individual flow's maximum packet size. Thus, as well as indicating its peak-bandwidth requirement, each flow could also specify a maximum packet size, $l^i_{max}$, representing that for the ith flow. For the network elements with equal input and output link speeds, and taking into account differences in maximum packet sizes of different flows, the delay bound may be approximated by a more general form of Equation (3):

$$\sum_i \frac{l^i_{max}}{\text{link\_rate}} \quad \text{(Eq. 6)}$$

where the summation is over all flows admitted to the buffer. In this case, explicit control of flows is now necessary. This can be achieved by applying a further CAC condition on packet-size which must be met in addition to the peak-rate test:

$$\frac{l^i_{max} + l_{max\_accum}}{l_{accoc}} \leq 1 \quad \text{(Eq. 7)}$$

Where $l_{max\_accum}$ is the sum of the maximum packet-lengths of all currently admitted BD flows, and $l_{alloc}$ is the maximum permitted sum of the maximum packet-lengths of flows. It is clear that this can be chosen by a network operator to ensure a specified delay bound, and corresponds to a bound on buffer-fill for the BD queue.

Further to considering the CAC rules for admitting multi-packet flows into the BD class it will be evident that these rules need to be slightly modified for the special case of single packet flows. For the conditions associated with Equation (2) the CAC process checks whether or not there is sufficient spare bandwidth to accept a new flow, but the concept of describing a single packet flow in terms of a continuous peak-rate parameter is meaningless. Nevertheless, some means of admitting flows as short as a single packet is needed that will ensure that the bandwidth allocated to the BD class is not exceeded. One suitable technique is to assign a peak-rate parameter which expires a suitable time after the flow has ceased. There are various possibilities for choosing a peak-bandwidth value, and one example is to use the $P_{k\_min}$ concept discussed earlier. A particular $P_{k\_min}$ value might be chosen as part of the network design process and CAC would then be pre-configured to default to using this value as the bandwidth parameter for single packet flows. Under these operating conditions the bandwidth admission test for a single packet is exactly as described for multi-packet flows except that $P_{k\_flow}$ (Equation 4) would be replaced by $P_{k\_min}$, viz $$\frac{P_{k\_min} + P_{k\_accum}}{P_{k\_alloc}} \leq 1 \quad \text{(Eq. 8)}$$

For the conditions associated with Equation (3) CAC also checks that there is sufficient spare buffer space available and applies the CAC rules described by Equation (7). This type of CAC approach of implicitly limiting the number of flows is still applicable for single packet flows, and for networks using the $P_{k\_min}$ concept described earlier, Equation (7) is directly applicable for both single and multi-packet flows.

However, the independent dual test CAC approach could enable more elaborate CAC methods to be considered than is possible with the $P_{k\_min}$ approach. One example of such a method is where the CAC processor, which maintains running totals of the available buffer space and bandwidth, allocates either all, or some proportion of the spare bandwidth to each new single packet flow. In the case where a proportion is allocated, the amount may, for example, be made proportional to the ratio of packet-size to available buffer space. Using either of these approaches does not affect the form of any of the previous CAC tests, it simply results in particular instances having slightly different definitions for the CAC parameters and values.

An additional benefit of this approach is that it also enables simple FIFO scheduling to be used, thus avoiding the complexity and significant processing overhead associated with schemes such as WFQ. Imposing a maximum packet size is particularly important when using FIFO scheduling because it also determines whether or not an acceptable level of bandwidth sharing occurs across all flows.

By way of example, when an initial packet in a new flow is received, the packet identifier (5, 16, 28, 38) having identified the packet as such may cause additional processing to take place to associate a peak rate bandwidth requirement with the bounded delay flow. This additional processing might, for example, involve the calculation of a bandwidth requirement on the basis of a delay requirement proposed by the user.

Further processing in the processing element (6, 17, 29, 39) may then determine whether the first buffer (4, 18, 30, 40) and associated output port (11, 5 23, 32, 42) are able to meet the CAC conditions and as a result of this may decide as to whether or not the new flow may be admitted to the first buffer (4, 18, 30, 40).

It will be clear that the identification between given flows and associated peak rate bandwidth requirements might be made in a number of ways.

Naturally there exists the possibility that any new bounded delay flow will be refused admittance to the first buffer under the CAC rules.

One approach to dealing with this possibility is to admit flow packets refused by the CAC rules to the second buffer, to be dealt with on a best effort basis. At the same time an appropriate 'connection refused' message may be relayed to the source. Subsequent packets from the same flow may continue to carry 'connection request' signalling information to ensure the continuing possibility that the flow may eventually be admitted to the first buffer.

In the most simple situation, worst case delay occurs at a network element when the buffer contains a backlogged packet from each admitted flow, so the worst case bound is equal to the sum of the largest packet size for each admitted flow, divided by the output link speed. Thus, reducing the maximum allowed packet size for the bounded delay class has an inversely proportional effect on the number of sessions that can be accommodated whilst achieving a specified delay bound. This effect may be considered when selecting a maximum permitted packet size for the bounded delay class.

Once a flow has been accepted, the necessary state information is stored in memory (not shown) and it remains there until the flow terminates, at which point an erasure process is initiated either by soft-state methods or by a predefined packet identifier.

Once a BD class flow has been admitted into the network, irrespective of whether it is a single or multi-packet flow, bandwidth and/or buffer space have effectively been reserved, and these resources must be released when a flow is terminated. The reserved resources could be released by either time-out mechanisms or specific requests. An example of using the specific request approach is one whereby the final packet of a flow initiates additional processing within the node to release its reserved resources. However, because flows are admitted on a peak-rate basis, this dictates that the resources cannot become available for re-use until the time lapse since admitting the final packet reaches a particular critical value, designated $T_{release}$. The value of $T_{release}$ is variable and this is because it is dependent on both the size of the last packet and the flow's peak-rate. For multi-packet flows, $T_{release}$ is equal to $$T_{release}^{multi\_pkt} = \frac{l_{last\_packet}^i}{P_{k\_flow}} \qquad (Eq. 9)$$

However, if there is a specified maximum allowed packet size for the BD class, $T_{release}$ could be made independent of packet size by using $$T_{release}^{multi\_pkt} = \frac{l_{max}^i}{P_{k\_flow}} \qquad (Eq. 10)$$

However, this would be at the expense of reducing resource utilisation efficiency, with the actual reduction being directly dependent on the maximum allowed packet size. An advantage of this simplification, however, is that $T_{release}$ can be calculated as part of the CAC process which could then start a release counter, which on reaching a value equal to $T_{release}$, could decrease the value of $l_{max\_accum}$ by an amount equal to $l^i_{max}$, and the value of $P_{k\_accum}$ by an amount equal to $P_{k\_flow}$.

The release procedure for single packet flows is identical to that described for multi-packet flows, the only difference being that when calculating $T_{release}$ the $P_{k\_flow}$ term is replaced by the appropriate bandwidth term. For instance, when using the $P_{k\_min}$, concept, as discussed earlier, all resource release computations using $P_{k\_flow}$ would use $P_{k\_min}$ instead.

It will be clear that once a flow has been accepted, flow packets subsequent to the flow header packet need not carry an indication of the peak-rate bandwidth requirement of the flow.

As discussed peak-rate CAC is used because it gives a deterministic bound on worst case buffer size, and hence it bounds worst case link delays to values determined by both the maximum packet size and the maximum number of simultaneous users. Consequently, packet loss can be prevented by using the worst case sized buffer, and link delays can be reduced as necessary simply by imposing an appropriate limit on maximum packet size. The use of buffer size less than the worst case will introduce a statistical probability of buffer overflow and consequent packet loss.

It is to be noted that CAC rules may be defined to enforce the provision of a combination of zero packet loss, together with an absolute or "worst-case" delay bound, which will represent the greatest delay that could ever be seen under any conditions (other than some failure).

A slight qualification to this statement is necessary because the bounds hitherto referred to as "worst-case" are valid only when the flows at the ingress of a node are peak-rate shaped, but it is well-known that the inter-packet spacings of a flow are likely to become perturbed as it propagates through the network. This results in occasional transient increases in peak-rate which could under some circumstances theoretically result in the "worst-case" bound being breached. The consequences of this are either packet-loss (if the buffer is dimensioned exactly to match the worst-case delay bound) or increased delay, if the buffer is larger than the worst-case delay bound.

However, in a well-designed network, and where the peak-rate sum of bounded-delay traffic is somewhat less than the servicing rate provided by the scheduler (priority queuing is ideal in this respect) any such transient fluctuations in peak-rate may be sufficiently limited so as not to breach the delay bound. Indeed, rather the reverse, and in many instances the conditions at particular nodes may be such that the worst-case bound is in statistical terms, overly pessimistic.

It is therefore not suggested that it is always appropriate for CAC to be take account of the worst-case delay bound because this bound becomes increasingly pessimistic as the maximum number of flows that can be accommodated increases. Rather, we believe that CAC rules can in some instances be relaxed somewhat, allowing more flows to be admitted, and that CAC might be applied in at least three ways, according to the location of a node:

Where the required delay bound is equivalent to a relatively small backlog of BD packets (for example, on a low-speed link), admission control is based on a combination of a "peak-rate sum test", and a "worst-case delay test".

Where the link-speed is such that the servicing time of an individual packet is sufficiently small compared with the required delay bound, statistical considerations may lead to the conclusion that only the "peak-rate sum test" need be applied.

Between these two extremes, it may well be appropriate for admission control to be based on a combination of a "peak-rate sum test" and a "statistical delay bound test". The latter is based on admitting flows up until the probability of exceeding a specified delay exceeds a certain (small) value.

Futhermore, in relation to the peak-bandwidth sum test, it may be considered practical to apply a degree of statistical multiplexing, particularly for nodes which are intended to carry large numbers of flows. This entails allowing the sum of the peak-rates for all admitted sessions to exceed the allocated peak-rate sum for the bounded-delay class traffic, based on the knowledge or likelihood that hosts will for some of the time, generate traffic at a level below their specified peak-rates.

It is anticipated that future networks will most likely support a mix of best-effort and bounded-delay traffic, in which case the use of peak-rate CAC for the bounded delay class will not necessarily lead to poor link utilisation. The reason for this is that the best-effort mode may adapt from the given predetermined shares to use any spare bounded-delay mode bandwidth. Effectively, this means that the bounded-delay mode will have a guaranteed maximum amount of the total bandwidth and that the best effort mode will have a guaranteed minimum amount, which on average will be larger as determined by the bounded-delay modes utilisation statistics. A similar situation also exists regarding buffer utilisation, as will now be explained.

If the bounded delay buffer is dimensioned so as to avoid any packet loss, on average it would appear to be excessively over dimensioned if the network only supported bounded-delay traffic. However, when supporting both modes of operation, any unused buffer space could be released as necessary for use by the best-effort mode One implementation of this feature could be to use particular levels of buffer fill as metrics for reclaiming/releasing buffer space. Hence it ought to be possible to dimension the total buffer space such that a reasonable level of buffer utilisation is achieved but without having to accept a certain probability of packet loss. Another way to view this is that rather than the bounded-delay mode having a finite probability of packet loss, as is usually the case, it becomes instead the probability of the best-effort mode giving up some buffer space.

Figure 2A:
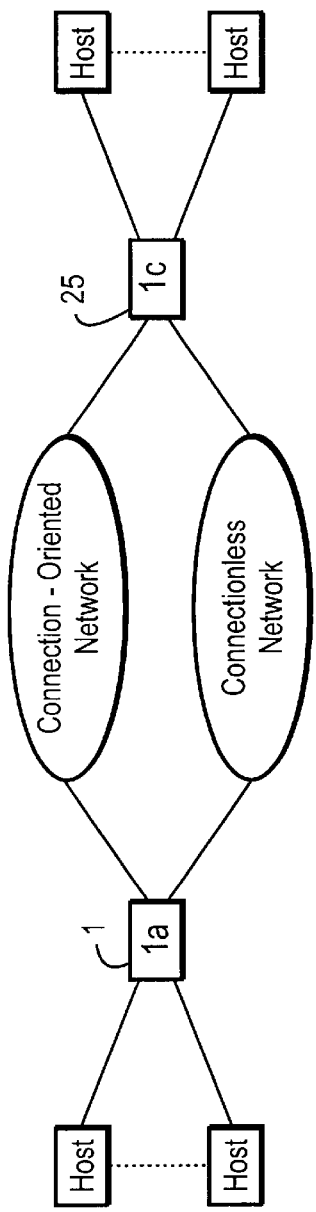
FIG. 2 illustrates different network architectures including the network elements illustrated in FIG. 1.
Figure 2B:
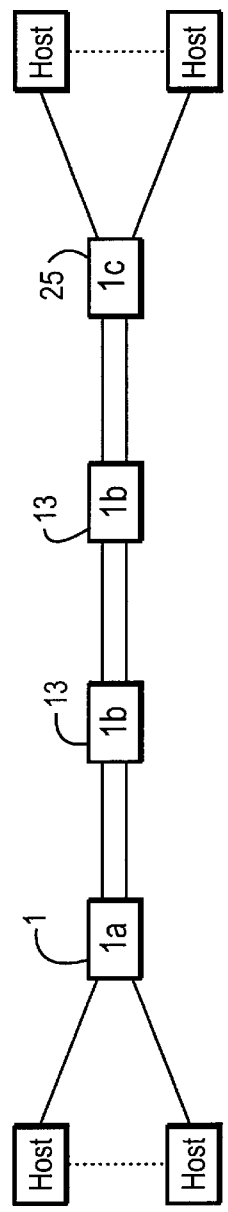
Figure 2C:
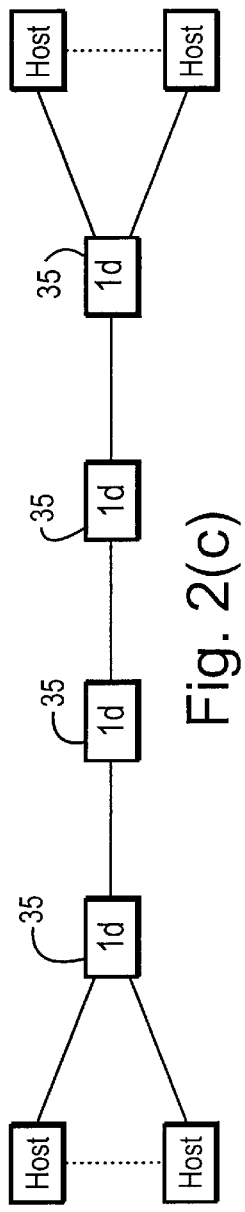

Through the use of appropriate combinations of the network elements depicted in FIGS. 1(a) to 1(d) a variety of network constructions are available, supporting both best effort and bounded delay modes, as illustrated in FIGS. 2(a) to 2(c).

Again, as discussed in respect of the network elements, it will be appreciated that whilst only a single path between the sending host and receiving host is indicated, in fact the network elements 1a–1d will have connections with many other constituent nodes (not shown) of the network.

In FIG. 2(a) an ingress node (1) based on the FIG. 1(a) node architecture and an egress node (25) based on the FIG. 1(c) architecture allow connection to physically separate respective connection—oriented and connectionless networks.

FIG. 2(b) shows a similar network example to that of FIG. 2(a) but utilising a number of nodes (13) as shown in the FIG. 1(b) node architecture to effect connection between the FIG. 1(a) node architecture ingress node (1) and the FIG. 1(c) node architecture egress node (25).

FIG. 2(c) depicts a network formed only from elements according to the FIG. 1(d) node architecture (35).

It is to be noted that CAC might only be performed at a single node or subset of nodes rather than at every node. It might be practicable, for example, to apply CAC at only the ingress or egress nodes.

An important feature of the invention is the ability to remove the need for delay negotiation when setting up a bounded delay mode flow. This is achieved by reducing network delays to the point where they become a negligible part of the overall end to end delay. As discussed several factors impact delay at an element but fundamentally they are determined by the speed of the output port link and the buffer fill which in turn depends on the maximum packet size and the CAC rules (i.e. the maximum allowed number of simultaneous users and the level of statistical multiplexing).

Figure 3A:
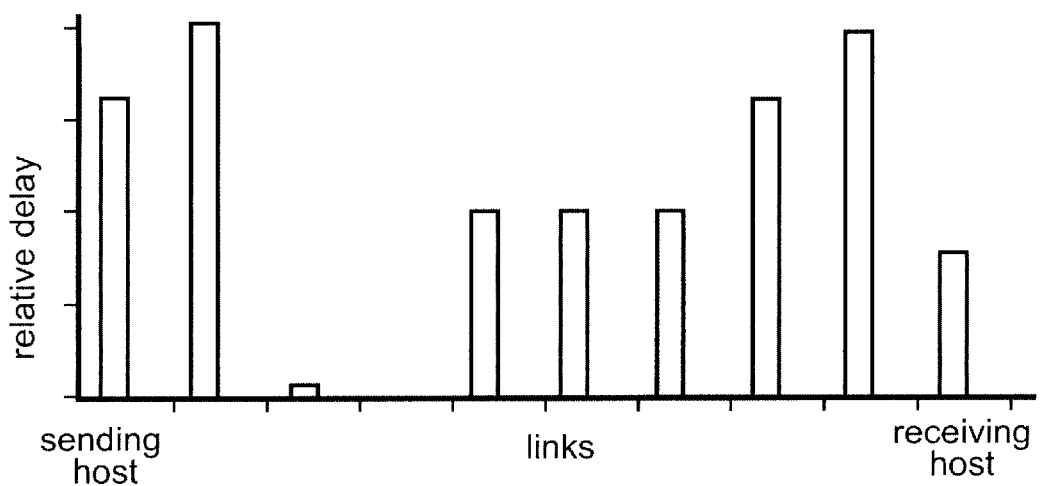
FIG. 3 illustrates relative delays in a network between a sending host and a receiving host as a function of differing network implementation.
Figure 3B:
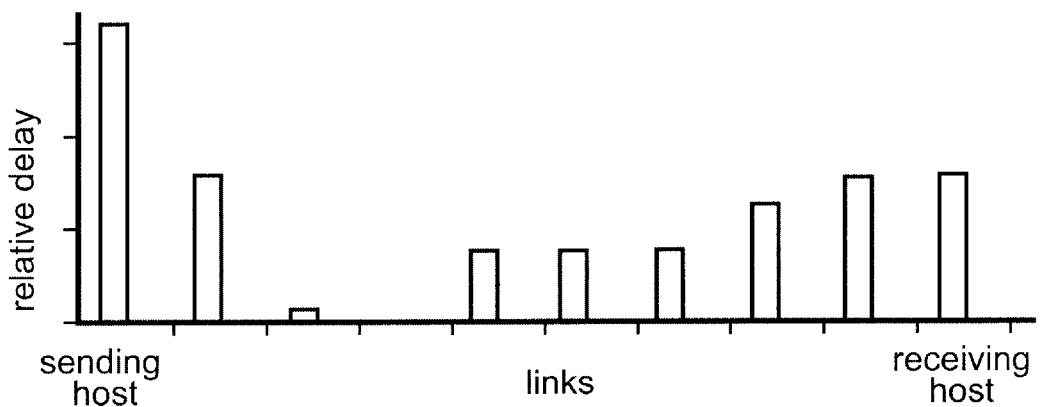
Figure 3C:
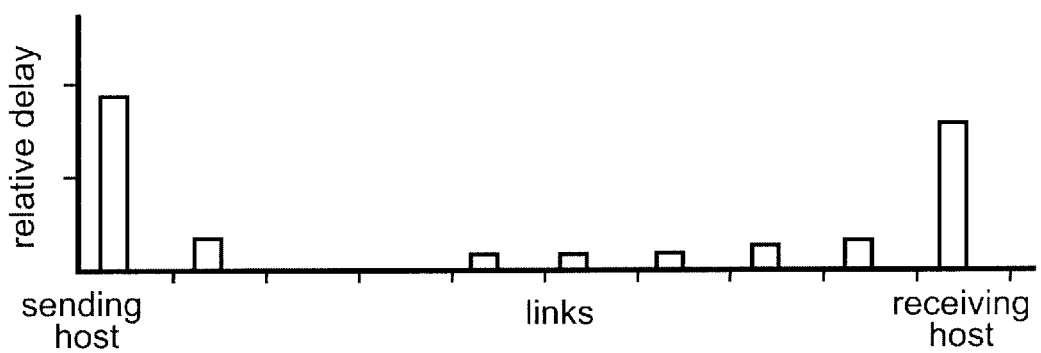

Purely schematic examples of variations in relative delay as a function of these parameters are as indicated in FIGS. 3(a) to 3(c).

FIG. 3(a) shows a schematic representation of the component parts of the overall end to end delay for a particular network configuration containing a number of network elements having a range of link speeds supporting only connection mode flows with, by way of, example, a maximum packet size of 1 Kbyte and using a statistical multiplexing ratio of 2.5. It is clear for this particular example that the overall end to end delay is dominated by the network link delays.

However, comparing FIG. 3(a) with FIG. 3(b) shows how these delays reduce when CAC prevents statistical multiplexing (i.e. instantaneous bandwidth requirements never exceed the amount allocated) and comparing yet further FIG. 3(c) with FIG. 3(b) shows the additional reductions achieved with a five-fold reduction in packet size. It is immediately clear from these comparisons that at some point the overall end to end delay makes a transition from being dominated by link delays to being dominated by host delays.

A further factor which influences link delay is the proportion of the total bandwidth allocated for connection mode operation. For instance, in our particular example the delay reductions achieved by decreasing the packet size are also representative of those that would result from reducing the bandwidth allocated to the bounded delay class from 100% to 25% of the total output link bandwidth.

From the preceding discussion it follows that for the bounded delay class of operation the combination of no statistical multiplexing (peak rate dimensioned bandwidth), small packet size, high link speed and a bandwidth allocation that is a small proportion of the total will enable link delays to be kept to a minimum.

An advantage of operating within the regime dominated by host delays is that applications should be able to control their own end to end delay simply by setting appropriate operating conditions without any need for the network to be involved but of course, ultimately this will depend on the application requirements. An example of this might be the determination of a nominal frame size of data which will be of use to the receiving host yet will still lie within a tolerable delay regime, occasioned by the frame fill/reading time. It is to be noted of course that the utility of the invention is not limited to operation in a regime where host delays dominate. An advantageous regime will also result, for example, where all delays are equal, but low.

As mentioned, the identification between given flows and the associated peak rate bandwidths nay be made in a number of ways. Resource Reservation Set-Up Protocol (RSVP) defined by the IETF provides one such means. The RSVP Path and Resv signalling messages would operate as normal, using Tspec and Rspec fields to identify the BD class flow and the peak rate requirements, $P_{k\_flow}$, for this flow, these signalling messages being passed hop by hop towards the receiver and then hop by hop back to the sender. For a node applying the peak-bandwidth CAC rule described in Eq.4 each hop back to the sender would compare the sum of the requested bandwidth, $P_{k\_flow}$, and the existing accumulated bandwidth, $P_{k\_accum}$, to the total bandwidth allocated on that outgoing port (sender to receiver direction) for BD class ($P_{k\_alloc}$). It would also ensure that other applicable CAC rules were applied in a similar manner.

If CAC is successful then the peak bandwidth for this flow, $P_{k\_flow}$, and the associated flow classifier are stored in the node together with any other parameters used for CAC control. This state is refreshed by RSVP messages as normal. Receipt of data packets could also be used to refresh this state. This soft state would therefore be removed if it was not refreshed and the associated bandwidth and flow counter modified accordingly. It will be clear that identification of flows which have passed CAC is required to police traffic and also to ensure that when flows cease, the corresponding changes in key utilisation parameters are recorded, for example, the correct $P_{k\_flow}$ value is removed from the outgoing port total, $P_{k\_accum}$. RSVP reservations for IP version 4 are identified by source address/destination address/port triples which act as the flow classifier. IP version 6 has the notion of a single field called the flow-id. Other classifiers relating to groups of senders or receivers (address prefixes), traffic type (port number/transport protocol) or other identifiers such as 'tags' are well known and could be used to provide an aggregated classifier. Multiple flows can be easily aggregated in the CAC and signalling processes of our invention by simply summing up the total peak bandwidth of the aggregated flows and storing this as an aggregated classifier, and also sending this aggregated total peak bandwidth, $P_{k\_flow}$ value to the next downstream node. The mode identification process may be accomplished in many ways and in this case could be part of the general 'out of band' RSVP signalling and classification process.

If CAC fails then the classifier state is stored but no resources are allocated. This classifier state is used to divert incoming BD packets from this flow into the BE buffer at this node to protect the other accepted BD flows in this node. Downstream nodes in which this flow passed CAC can still put this packet back into the BD class. RSVP messaging could ensure that the customer is informed of an incomplete reservation or other protocols or diagnostic tools could provide this feedback. The customer could at that point decide to cease the flow due to the BD class request failing, which would result in the classifier state in all nodes timing out. If the user continues to send ED packets then in certain nodes (failed CAC) they would use the BE buffer, then at some time later resources could become available in that node, which on refresh of the CAC process would lead to this flow being admitted to the BD class. A number of algorithms are possible for this, but one example would be that failed flows in a node are searched on a First Failed First Served basis to find the flow(s) with $P_{k\_flow}$ which can fill up this newly released resource. The best algorithm will depend on other factors such as the billing model, the number of different flow types and the target utilisation of the node.

Policing could either be done at all nodes, or only at the ingress and egress nodes of this delay-bounded network when sufficient capacity has been provided for the traffic matrix and the allocated amount of ED class capacity. The policing would act to ensure that the BD class flows kept within the declared maximum packet length and peak rate, and also to implement functions such as packet counting, reservation policy and billing.

Routing changes would result in the packets for this flow using different nodes and the refresh mechanism would be used to invoke CAC in the new nodes whilst the soft state would ensure that the old nodes returned the previously reserved bandwidth.

Figure 4:
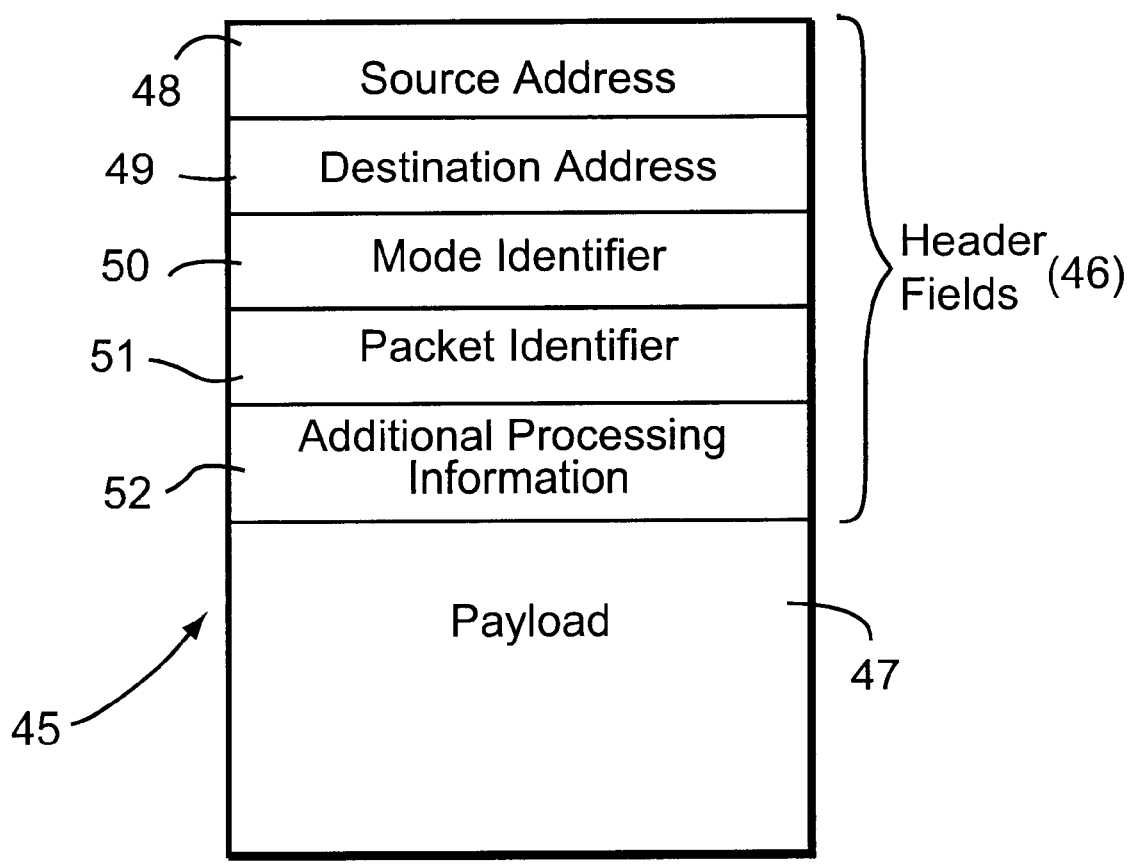
FIG. 4 illustrates an exemplary packet structure for use in conjunction with the above.

An alternative implementation would be to use so called 'On the Fly' signalling. This avoids the use of RSVP and the associated round trip delay by using the first packet to signal the required parameters for this flow, and one implementation is described below, with reference to FIG. 4.

The flow packets (45) are defined to have a header portion with a number of fields and a data carrying payload portion (47).

The first two header fields (48, 49) carry the source and destination addresses, these being used to route packets across the network in the usual manner. Other well known fields may also be included.

In the most simple embodiment the mode identifier field (50) is used to distinguish between best effort and bounded delay mode packets. The packet identifier field (51) is used to indicate packets of particular functionality.

The additional processing information field or fields (52) is used to indicate to network elements information such as the effective peak data rate that the host has selected for its bounded delay mode flow.

All of these header fields (46) may be specified by the application. Alternatively they may be specified by the ingress node on entry to the bounded delay network. The payload portion of the packet (47) contains the information to be transported across the network to the destination host.

In this way, having regard to the network element embodiments described with respect to FIG. 1, the mode identifier may carry out the mode identification by means of reading the Mode Identifier field (50) in the header of the received packets (45). In similar fashion the leading packet of a new flow may be used to initiate the Connection Admission Control (CAC) procedure. The packet identifier having identified the leading packet of a new flow from the Packet Identifier field (51) may cause the proposed Bandwidth requirement to read from a leading packet header Bandwidth field (52), whereupon the peak rate CAC decision may be made. Other such parameters could be acquired in a similar fashion.

Thus bounded delay class flows may be established without a separate signalling phase, using 'signalling on the fly'.

Similarly, a particular packet identifier could also be defined for the purpose of sending intermediate packets within a flow for additional processing thus enabling applications to dynamically adjust their end-to-end delay requirements as necessary.

All packets could include the mode identifier for the BD class. However, the mode identifier could be taken from the first 'signalling packet' and stored (cached) as part of the classifier, and then recovered whenever a packet matching the classifier is received and used to put the packet into the correct buffer. Alternatively, the mode could be statically configured for specific classifiers and in particular for aggregated classifiers to automatically provide BD class for VPN configurations and for specific traffic types such as Internet telephony.

With 'signalling on the fly' the first packet in the flow includes the associated peak rate bandwidth for the flow, $P_{k\_flow}$ and any other parameters needed for CAC. A new flow could be admitted in every node on the end to end path using the same CAC rules as described above. If the flow fails CAC then failure classifier state is installed as before, but now a new 'CAC Failed' message is returned to the sender. This could be a new ICMP code or some other means. In addition, a 'CAC failed' flag is set in the first packet header so that downstream nodes and the receiver are also informed of the failure and downstream nodes do not also send back CAC failure messages which could otherwise swamp the sender. The remaining packets in the flow, which match the classifier and have the BD mode set, are admitted into the BD buffer, but use the BE buffer in nodes which failed the flow during CAC. Refreshing of the signalling packet, indicating the $P_{k\_flow}$ value and other CAC parameters, is used to cope with routing changes, time-out of classifier state and later admittance to resources on initial failure during CAC.

It is noted that with the approach outlined above for single packet flows, there is no need to convey peak-rate information in the packet header, so the field normally used to carry this information could be set to some defined default value, such as zero, and be used for indicating a single packet flow.

For todays IP v 4 protocol the preceding example could be implemented by specifying mode and packet identifier codes for use in the TOS header field. The required bandwidth could be either pre-configured or placed in the IP v 4 options field. For IP v 6 the mode and packet identifier codes could be placed in the flow ID field and the bandwidth requirement could be placed in the hop-by-hop extension (options) header. When information needs to be sent back to the sender host, appropriate ICMP messages could be generated, for example flow admission refused etc.

It is very likely that some form of traffic processing capability will be required within both the originating and receiving host terminals depending on both type of application being used and the number of simultaneous flows being generated. Therefore, it is expected that in general hosts might also make use of the dual buffering nature of the network elements.

Figure 5:
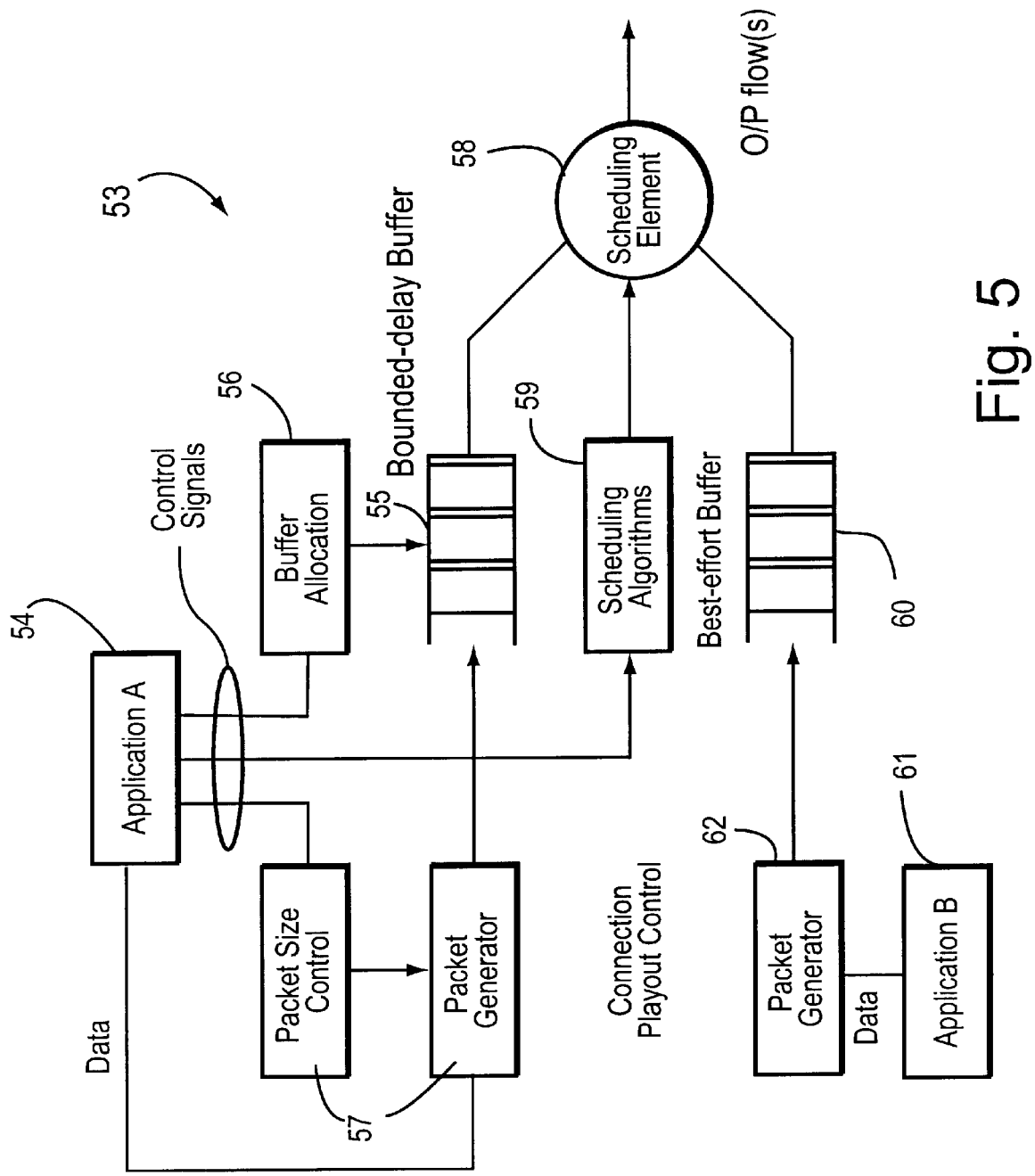
FIG. 5 illustrates an exemplary host architectural configuration.

An example of an arrangement of such a host architecture is as indicated in FIG. 5. The host may, for example, be implemented using well known Unix work station or PC technology equipped with a suitable network interface.

In the general host configuration (53) shown in FIG. 5, Application A (54) produces one or more flows which are to be sent in the bounded delay class. Given that applications using this class of operation will in general generate bursty packet flows, in some instances at rates determined by the internal operating speed of the host rather than those of the application, a bounded delay buffer (55), buffer allocation and packet size controls (56, 57) are provided for host performance control along with an associated scheduling element (58) for flow shaping purposes. The scheduling element (58) is controlled by an appropriate scheduling algorithm (59).

Because hosts could in principle be simultaneously running both bounded delay and best effort flows, a best-effort buffer (60) is provided purely to accommodate the fact that the scheduling algorithm(s) (59) will have been designed to give highest priority to packets stored in the bounded delay buffer (55). Application B (61) could also have similar control over buffer allocation (not shown) and packet size 162) as shown for Application A (54).

Traffic shaping is an important aspect for flows that are to be guaranteed a delay bound, and primarily shaping enables the inter-arrival times between packets generated by an application to be modified prior to being input into the network. Hence, the burstiness of a packet flow can be controlled by shaping, the outcome of this being that a lower peak bandwidth is needed from the network than may otherwise have been the case. Effectively, traffic shaping is simply a trade-off between network bandwidth requirement and host delay, with the latter decreasing as the former increases. To date, traffic shaping has in general been achieved using either token bucket or leaky bucket shapers, with combinations of both being used in some instances.

It is well known that although token bucket shaping cannot prevent packet bursts from being input into the network, it does bound the size of the bursts. Therefore, token bucket shaping does not eliminate the possibility of the flow rate instantaneously exceeding the specified peak-rate when the instantaneous value is calculated over any time period that is measured from the beginning of any packet sequence (which could be a single packet) and an adjacent one, as illustrated in FIG. 7. Based on this definition, the instantaneous peak-rate for a flow is given by $$\text{instantaneous\_peak\_rate} = \frac{\sum^{t_x} l_{packet}}{t_x} \quad \text{(Eq. 11)}$$

where $l_{packet}$ is the size of a packet in bits and the algebraic sum indicates a summation across all packets contained by the particular time span being considered, of which $t_1$, through to $t_5$ in FIG. 7 are examples.

When the shaping process used ensures that the instantaneous peak rate never exceeds the specified peak-rate, this is referred to below as strict peak rate shaping.

The reason why conventional token bucket shaping cannot provide strict peak-rate shaping, is that the scheduling algorithm used allows packets to be input into the network immediately the appropriate number of tokens become available. This is illustrated in FIGS. 6(a) and 6(b) which show a qualitative comparison between flows produced by token bucket and peak-rate shaping for a particular instantaneous fill of the bounded delay buffer. Given that strict peak-rate shaping never allows the flow to exceed the specified peak-rate when calculated according to Equation (11), it is clear from comparing flows A and C that in this particular instance the token bucket shaped flow exceeds the specified peak-rate. It should be noted that for the output flows to take the given forms the token bucket would have initially been full of tokens and the output link speed would have been significantly greater than the specified peak-rate. Also, the bucket fill rate r and the $P_{k\_flow}$ term in Equation (12) below would both have been equal to the same value of specified peak-rate.

Although it is expected that a controlled amount of packet bunching will be tolerable, for some implementations it may be advantageous to use strict peak-rate shaping rather than conventional token-bucket or leaky bucket shaping. This will give tighter control of the instantaneous peak-rate. One method of achieving strict peak-rate shaping is shown in FIGS. 6(a) and 6(b): for convenience the best-effort elements shown in FIG. 5 have been removed along with those from the bounded delay class which do not contribute to the shaping process. Peak-rate shaping effectively prevents packet bunching in such a way that it is able to guarantee that the flow rate into the network will never exceed the specified peak-rate. A good example of a scheduling algorithm that satisfies this is one whereby the decision to input a packet into the network is based on the size of the previous packet and the time at which it was sent. Therefore, the scheduling element does not admit a new packet into the network until the time lapse since admitting the previous packet, $\tau''_{lapse}$, satisfies the relationship $$\tau^n_{lapse} \geq \frac{l^{n-1}_{packet}}{P_{k\_flow}} \quad \text{(Eq. 12)}$$

where $l_{packet}$ represents packet size in bits and represents the specified peak rate for the flow in bits/second. Superscript n represents the packet to be sent and superscript n−1 the previously sent packet.

It should also be possible to implement strict peak-rate shaping using a token bucket shaper provided an appropriate bucket size is used in conjunction with a different scheduling rule than presently used. For example, if there is a specified maximum allowed packet size for the bounded delay class, then peak-rate shaping would be achieved using a bucket size equal to the maximum allowed packet size in conjunction with the rule that no packets can be sent until the token bucket is full. Once the bucket is full, then the buffer is played out until either the token bucket is emptied or the buffer is emptied. No more packets are then sent until the token bucket is completely full again, and so on. Using this approach for the conditions assumed for the qualitative comparison in FIGS. 6(a) and 6(b) would result in bunching similar to that illustrated by flow B.

However, more conventional types of shaper are not precluded including those based on (r,T)-smooth scheduling algorithms.

Irrespective of which type of shaping is used, the host configuration (53) in FIG. 5 enables application A to select the appropriate shaper parameters in conjunction with other control parameters such as packet size, buffer allocation and peak flow rate. However, if this host was being used on a network supporting IP integrated services it would use token bucket shaping, and most, if not all, of the other parameters and those for the token bucket would be considered as constants once they had been selected for a new flow. The main reason for this is that some of these parameters need to be distributed within the network, and this involves initiating an RSVP signalling phase whenever they are changed. This is not of particular concern when initially setting up a flow, but it is otherwise because signalling delay severely limits the rate at which changes can be implemented. This severely limits the control that an application has over both the host performance and its end-to-end delay once a flow is established. This is not the case when using a network supporting the bounded delay class.

In one simple embodiment of invoking bounded delay operation, the only information required by the network is the flow's required peak-rate, and this can be provided by 'on the fly' signalling. Consequently, the application could now continually monitor the host performance during the life-time of a flow and adjust as necessary buffer allocation, packet size, packet discard or peak-rate as often as required and without any need to involve the network. This gives the application far greater dynamic control over the host performance than would normally be possible. For instance, if the application initially requests insufficient buffer size for the data-rate chosen it will now have the option of being able to discard packets, increase the buffer size at the expense of increased delay, reduce the packet size at the expense of reduced bandwidth efficiency (more headers per unit time) or it will be able to request a higher peak-rate from the network.

Whilst embodiments of the invention have been described above in terms of a bounded delay class and a connectionless best effort class, a range of further sub classes are possible.

For example, for the bounded-delay class, if the approach is adopted whereby new flows signal their maximum packet sizes as part of the CAC process, separate classes could be defined for two or more specific ranges of packet size. By separately controlling allocations of bandwidth or buffer resource for each of these, some control is obtained over the distribution of packet-sizes for admitted flows, which may lead to an improvement in the bandwidth-utilisation of the overall bounded-delay class. One potential benefit of this might be in improving the probability of admission for flows with small packet sizes.

A further possibility is that sub-classes could be established to provide different values of bounded-delay. This could be achieved by separating packets into multiple virtual queues within the main bounded-delay queue.

Similarly within the best-effort class, the implementation of traffic management features such as Random—early detection (RED), priority queuing, IETF Intserv, class-based queuing (CBQ) and other such techniques are not precluded.

What is claimed is:

1. A packet network element comprising:
   at least one input for receiving flow based packets;
   at least one output of predetermined bandwidth;
   wherein a received packet is associable with a first or second class of service;
   means for directing each received packet on the basis of its class to a first or a second corresponding packet buffer,
   said first packet buffer being allocated a predetermined portion of the output bandwidth;
   said second packet buffer being allocated the remaining portion of the output bandwidth;
   means for directing packets from the first and second packet buffers to an output;
   first class flow bandwidth requirement determination means arranged in operation, selectively for said first class flows, to determine bandwidth requirements associated with first class flows; and
   first class flow buffer admission means arranged in operation, selectively for said first class flows, to allow admission of the first class flow packets to the first packet buffer if said associated bandwidth requirement can be met.

2. An element as claimed in claim 1 wherein said first class flow buffer admission means is operable to apply a peak rate test to determine a peak rate bandwidth requirement, allowing admission to the first buffer if the currently unused portion of said predetermined portion of the output bandwidth is able to meet said peak rate bandwidth requirement.

3. An element as claimed in claim 2 wherein said means for allowing admission is operable to apply said peak rate test and to apply a buffer-fill test, allowing admission if said first packet buffer has sufficient space to accept another flow.

4. An element as claimed in claim 3 wherein:
   said admission allowing means is arranged to allow admission of the first class flow packets to the first packet buffer only if:
   the number of flows the first packet buffer is sized to accommodate minus the number of flows currently accommodated is at least unity; and
   the free portion of the output bandwidth allocated to the first packet buffer minus the peak rate bandwidth requirement is greater than or equal to zero.

5. An element as claimed in claim 4 wherein said admission allowing means is operable to increase the size of said free portion on the cessation of a flow, said increase taking place after the lapse of a time period substantially equal to the packet-size divided by the peak rate associated with the flow.

6. An element as claimed in claim 1, further comprising means to admit first class flow packets to the second packet buffer if they were refused admission to the first packet buffer.

7. An element as claimed in claim 2 wherein said first class flow bandwidth requirement determination means is arranged to read a peak rate flow bandwidth requirement information portion from said received packet.

8. An element as claimed in claim 1 wherein said predetermined portion of the output bandwidth allocated to the first packet buffer may be dynamically changed.

9. An element as claimed in claim 2 wherein said peak rate bandwidth requirement determining means is arranged to determine particular peak rate flow bandwidth requirement values for respective single packet flows.

10. An apparatus according to claim 1 further comprising class determining means for determining whether said received packet is associated with a first or second class of service.

11. An element as claimed in claim 10 characterised in that the class determining means is arranged to determine whether the packets are associated with one of a bounded delay or best effort class of service.

12. An element as claimed in claim 10 wherein said class determining means is arranged to read a class identifying portion from said received packet.

13. A method of controlling flow based packets in a packet network element comprising:
   receiving flow based packets;
   wherein a received packet is associable with a first or second class of service;
   directing each received packet on the basis of its associated class to a first or a second corresponding packet buffer,
   said first packet buffer being allocated a predetermined portion of a predetermined output bandwidth;
   said second packet buffer being allocated the remaining portion of the output bandwidth; and
   directing packets from the first and second packet buffers to an output;
   selectively for said first class flows:
   determining bandwidth requirements associated with said first class flows; and admitting said first class flow packets to the first packet buffer if said associated bandwidth requirement can be met.

14. A host element for use in association with a packet network comprising:
   means for generating packet based flows and for associating each flow with a respective first or second class of service;
   a first packet buffer, having a first packet buffer size, arranged to receive packets associated with the first class of service;
   means for controlling the first packet buffer size;
   a second packet buffer arranged to receive packets associated with the second class of service; and
   means for directing packets from the first and second packet buffers to an output arranged to ensure that the first class packet flow rate does not exceed a selected peak rate bandwidth.

15. A host element as claimed in claim 14 wherein means are provided for writing the first or second class of service into a class identifying portion of said packets.

16. A host element as claimed in claim 15 wherein means are provided for writing a peak rate flow bandwidth requirement information into a peak rate flow rate bandwidth requirement portion of said packets.

17. A host as claimed in claim 16 characterised in that said means for generating and associating is arranged to generate packets associated with a selected one of a bounded delay or best effort class of service.

18. A method of generating packet based flows comprising:
   generating packet based flows and associating each flow with a respective selected associated first or second class of service;
   sending packets of first class flows to a first packet buffer, having a first packet buffer size, arranged to receive packets associated with the first class of service;
   controlling the first packet buffer size;
   sending packets of second class flows to a second packet buffer arranged to receive packets associated with the second class of service; and
   directing packets from the first and second packet buffers to an output arranged to ensure that the first class packet flow rate does not exceed a selected peak rate bandwidth.

19. A packet network comprising one or more packet network elements, each packet network element comprising:
   at least one input for receiving flow based packets;
   at least one output of predetermined bandwidth;
   wherein a received packet is associable with a first or second class of service;
   means for directing each received packet on the basis of its class to a first or a second corresponding packet buffer,
   said first packet buffer being allocated a predetermined portion of the output bandwidth;
   said second packet buffer being allocated the remaining portion of the output bandwidth;
   means for directing packets from the first and second packet buffers to an output;
   first class flow bandwidth requirement determination means arranged in operation, selectively for said first class flows, to determine bandwidth requirements associated with first class flows; and
   first class flow buffer admission means arranged in operation, selectively for said first class flows, to allow admission of the first class flow packets to the first packet buffer if said associated bandwidth requirement can be met.

20. A network as claimed in claim 19 further comprising one or more host elements for use in association with a packet network, each said host element comprising:
   means for generating packet based flows and for associating each flow with a respective first or second class of service;
   a first packet buffer arranged to receive packets associated with the first class of service;
   means for controlling the first packet buffer size;
   a second packet buffer arranged to receive packets associated with the second class of service; and
   means for directing packets from the first and second packet buffers to an output arranged to ensure that the first class packet flow rate does not exceed a selected peak rate bandwidth.

21. A packet network element comprising:
   at least one input for receiving flow based packets;
   at least one output of predetermined bandwidth;
   first means for determining whether a received packet is associated with a first or second class of service;
   means for directing each received packet on the basis of its associated class to a first or a second corresponding packet buffer,
   said first packet buffer being of predetermined size to accommodate a predetermined number of flows and being allocated a predetermined portion of the output bandwidth, a currently unused portion thereof varying with the number of flows accommmodated,
   said second packet buffer being allocated a remaining portion of the output bandwidth;
   second means for determining a peak rate flow bandwidth requirement associated with a flow;
   first class flow buffer admission means for allowing admission of the first class flow packets to the first packet buffer if the first packet buffer is able to accept another flow and if the currently unused portion is able to meet the associated peak rate flow bandwidth requirements; and
   means for directing packets from the first and second packet buffers to an output.

* * * * *

UNITED STATES PATENT AND TRADEMARK OFFICE
CERTIFICATE OF CORRECTION

PATENT NO. : 6,538,989 B1 Page 1 of 1
APPLICATION NO. : 09/180102
DATED : March 25, 2003
INVENTOR(S) : Carter et al.

It is certified that error appears in the above-identified patent and that said Letters Patent is hereby corrected as shown below:

On the face of the patent, left-hand column, in the section labeled "References Cited", insert:

5,555,265    9/1996    Kakuma et al.    370/60

Signed and Sealed this

Twenty-fifth Day of March, 2008

JON W. DUDAS
*Director of the United States Patent and Trademark Office*